US012627243B2

(12) United States Patent　　(10) Patent No.:　US 12,627,243 B2

Stickelmann et al.　　(45) Date of Patent:　May 12, 2026

(54) METHOD FOR OPERATING AN INVERTER, AND INVERTER

(71) Applicant: SMA Solar Technology AG, Niestetal (DE)

(72) Inventors: Uwe Stickelmann, Kaufungen (DE); Alexander Unru, Baunatal (DE)

(73) Assignee: SMA Solar Technology AG, Niestetal (DE)

( * ) Notice: Subject to any disclaimer, the term of this patent is extended or adjusted under 35 U.S.C. 154(b) by 144 days.

(21) Appl. No.: 18/420,895

(22) Filed: Jan. 24, 2024

(65) Prior Publication Data

US 2024/0162837 A1　　May 16, 2024

Related U.S. Application Data

(63) Continuation of application No. PCT/EP2022/068782, filed on Jul. 6, 2022.

(30) Foreign Application Priority Data

Jul. 30, 2021　(DE) ..................... 10 2021 119 899.2

(51) Int. Cl.
　　*H02M 7/5387*　　(2007.01)
　　*H02M 1/00*　　(2006.01)
　　*H02M 1/088*　　(2006.01)

(52) U.S. Cl.
　　CPC ..... *H02M 7/53871* (2013.01); *H02M 1/0064* (2021.05); *H02M 1/0077* (2021.05); *H02M 1/088* (2013.01)

(58) Field of Classification Search
　　CPC ........... H02M 7/53871; H02M 1/0077; H02M 1/0064; H02M 1/088
　　See application file for complete search history.

(56) References Cited

U.S. PATENT DOCUMENTS 8,253,273 B2 *　8/2012　Fredette ................. H02M 1/10
　　　　　　　　　　　　　　　　　307/64
8,362,658 B2 *　1/2013　Ahlborn ................. H02M 7/72
　　　　　　　　　　　　　　　　　324/120

(Continued)

FOREIGN PATENT DOCUMENTS

DE　　102015012562 A1　　4/2016
JP　　　2009247186 A　　10/2009

(Continued)

OTHER PUBLICATIONS

International Search Report dated Oct. 11, 2022, for International Application No. PCT/EP2022/068782.

*Primary Examiner* — Adolf D Berhane

(74) *Attorney, Agent, or Firm* — Eschweiler & Potashnik, LLC

(57)　　　　　ABSTRACT

The disclosure is a method for operating an inverter with a DC input and an AC output. The DC input is connected to a DC source, bridge branches of a bridge circuit are connected to the AC output via power chokes, and the AC output is connected to an AC grid via isolating switches. The method includes opening the isolating switches, and controlling semiconductor switches of at least two bridge branches of the bridge circuit that are connected downstream of at least one power choke at the AC side, such that a DC source connected to the DC input is loaded. The sum of the currents flowing out of at least one of the at least two bridge branches on the AC side corresponds to the sum of the currents flowing into at least one other bridge branch of the at least two bridge branches on the AC side.

15 Claims, 11 Drawing Sheets

(56)        References Cited

U.S. PATENT DOCUMENTS

| | | |
|---|---|---|
| 10,069,444 B2 | 9/2018 | Niwa |
| 10,554,148 B2 * | 2/2020 | Brueckner ............. H02H 9/001 |
| 11,038,438 B2 | 6/2021 | Gloes et al. |
| 2010/0127576 A1 | 5/2010 | Ahlborn et al. |
| 2013/0119763 A1 | 5/2013 | Zhu et al. |
| 2016/0322917 A1 | 11/2016 | Matsuoka et al. |
| 2020/0195168 A1 | 6/2020 | Gloes et al. |

FOREIGN PATENT DOCUMENTS

| | | |
|---|---|---|
| JP | 2014117086 A | 6/2014 |
| WO | 2020115284 A1 | 6/2020 |

* cited by examiner

METHOD FOR OPERATING AN INVERTER, AND INVERTER

REFERENCE TO RELATED APPLICATIONS

This application is a Continuation of International Application number PCT/EP2022/068782, filed on Jul. 6, 2022, which claims the benefit of German Application number 10 2021 119 899.2, filed on Jul. 30, 2021. The contents of the above-referenced patent applications are hereby incorporated by reference in their entirety.

FIELD

The application relates to a method for operating an inverter with a DC input and an AC output as well as an inverter and its use. The inverter can be used to connect photovoltaics or other specific DC voltage sources to an AC grid.

BACKGROUND

In some situations, when operating an inverter, it is necessary to load a DC source from which the inverter feeds electrical power into an AC grid. The term AC grid can be used, for example, to refer to an alternating current grid or an alternating voltage grid. The term DC can be used to refer to direct current or direct voltage, a DC source can accordingly refer to a direct current source or a direct voltage source.

As an example, there is a requirement to discharge the DC source, for example, a hydrogen fuel cell or an input intermediate circuit in a PV (photovoltaic) system, within a specified time in the event of an AC grid failure or a controlled shutdown of the system. For this purpose, resistors can be connected to the output side of the DC source for discharging. These resistors convert the residual energy from the fuel cell or the intermediate circuit into heat. As the residual energy is usually quite high, the resistors must be able to convert high amounts of energy and are therefore very large and expensive. In particular, these resistors represent additional components which mean an increased complexity of the control and operation of the overall system.

A PV inverter usually starts up in the morning as soon as the DC voltage of the PV generator is sufficiently high and the inverter is connected to the AC grid. It is problematic if the DC voltage is sufficiently high but the irradiation is so low that a grid connection on the AC side would cause the DC voltage to collapse again immediately and cause an immediate AC grid disconnection. This continuous switching operation is detrimental to the service life of the grid disconnection point, as it is usually only designed for a certain number of switching cycles. At this point, it makes sense to only initiate an AC grid connection if not only sufficient DC voltage but also sufficient DC power is available. The same problem can also occur in wind generators if sufficient power is not yet available.

In two-stage inverter topologies that have a DC/DC converter upstream of the inverter bridge, the available power of the DC source can be determined by loading it and thus charging the intermediate circuit of the two-stage inverter to a certain potential. The energy content of the charging process can be used to draw direct conclusions about the power availability of the DC source.

In single-stage topologies, the DC voltage of the DC source is mainly used as an indicator. However, this indicator can be unreliable as the information about the rated current is missing in this case.

SUMMARY

One object of the disclosure is to provide an improved method and an improved inverter for loading a DC source that can be connected to the inverter.

An inverter has a DC input for connecting to a DC source and an AC output for connecting to an AC grid via isolating switches, wherein bridge branches of a bridge circuit are connected to the AC output via power chokes. The AC output of the inverter can be connected to the AC grid via the isolating switches and disconnected from the AC grid via the isolating switches. The inverter is configured to feed the electrical power provided by the DC source into the AC grid. A method for operating the inverter comprises:

a) opening the isolating switches, and
   b) controlling semiconductor switches of at least two
      bridge branches of the bridge circuit, wherein the
      bridge branches are connected downstream of at least
      one power choke at the AC side, such that a DC source
      connected to the DC input of the inverter is loaded.

A totality of currents flowing out of at least one of the at least two bridge branches on the AC side of the inverter corresponds in its sum to a totality of currents flowing into at least one other bridge branch of the at least two bridge branches on the AC side. This means that the sum of the currents flowing out of the bridge branches on the AC side corresponds to the sum of the currents flowing into the bridge branches on the AC side.

Energy can therefore be converted between two or more bridge branches of the inverter in order to discharge the DC side due to the resulting conversion losses. Such an inverter and an inverter operated in such a way enables a load of the DC source from which the inverter can feed power into an AC grid. The load can be applied without the use of additional resistive components. This enables a simpler and more cost-effective design of the inverter. Furthermore, the DC source from which the inverter can feed electrical power into the AC grid can be selectively loaded without having to feed power into the AC grid in this situation. The DC source is loaded by drawing electrical power from the DC source and consuming it within the inverter. The power does not have to be consumed by additional components and/or by feeding into an AC grid and/or by other components that can be connected to the AC output. For this purpose, the switching losses of an inverter, which can be in the order of approx. 2% of the nominal power of the inverter if the efficiency of the bridge circuits is 98%, for example, are used for achieving a self-consumption without having to connect an AC-side load or sink. However, it is possible to operate other existing consumers in the system, such as, for example, fans. With a nominal power of the inverter of 100 kW, the discharge power can therefore be 2 kW. This value constitutes a significant advantage over, for example, discharging a DC voltage source by means of a 2 kW resistor.

This can be used, for example, for a rapid discharging of DC-side charge storage systems, such as in the form of an application for a hydrogen fuel cell or a PV system in the event of an AC grid failure or also for a controlled shutdown of the hydrogen fuel cell system or the PV system.

The connection on the AC side of the at least two bridge branches of the bridge circuit downstream of the at least one power choke can be effected, for example, by closing a relay before act b). It is also possible that the connection on the AC side of the at least two bridge branches of the bridge circuit downstream of the at least one power choke is already present and no relay needs to be provided for this. It is usually necessary that the connection of the bridge branches is established via switching devices, such as relays, in order to perform the method after a disconnection from the grid. In inverters that have two or more parallel bridge branches for each phase, which are operated in an interleaving mode for example, a connection of the bridge branches downstream of the at least one power choke of the parallel bridge branches is already present, such that the method can be performed using these parallel bridge branches without the use of additional relays. Nevertheless, in this case, single ones of the two or more parallel bridge branches per phase can alternatively be connected to bridge branches of other phases via relays.

In one embodiment, for example, in a three-phase inverter that has a bridge branch for each phase, for example, two bridge branches can be connected with each other such that the current flowing out of one bridge branch flows into the other bridge branch.

In one embodiment, however, all three bridge branches of a three-phase inverter, for example, can be connected with each other such that the current flowing out of one bridge branch is divided and flows into the other two bridge branches or the currents flowing out of two bridge branches flow in total into the third bridge branch.

In one embodiment of the method, the semiconductor switches for loading the DC source connected to the DC input are controlled in such a way that the inverter is operated in a voltage-controlled operation with a voltage of zero at the AC output. In such an embodiment, for example, when connecting bridge branches of all three phases of a three-phase system, controlling the semiconductor switches can be done in the same way as in regular supply operation, wherein merely the regulation of the inverter must regulate in a voltage-controlled operation to a nominal value of the output voltage of zero, corresponding to the short circuit that is present due to the connection of the bridge branches. In one embodiment, when connecting two phases of a three-phase inverter, in a voltage-controlled operation with an output voltage of zero, additionally a phase shift of 180° between the currents is set in the method instead of a phase shift of 120° that occurs in regular operation of a three-phase inverter.

In one embodiment, the bridge circuit for a three-phase inverter can be a B6 bridge circuit, for example.

In one embodiment with, for example, a single-phase inverter with, for example, an H4 bridge circuit or an H5 bridge circuit that has a total of two bridge branches, these two bridge branches can be connected with each other.

Even in a single-phase system, the control of the semiconductor switches for loading the DC source connected to the direct current input can be carried out in such a way that the inverter is operated in voltage-controlled operation with a voltage of zero at the AC output in one embodiment.

When connecting only two bridge branches of a three-phase inverter or a single-phase inverter or of parallel bridge branches of one phase, the semiconductor switches of the bridge branches can each be controlled in such a way that they operate as DC/DC converters, according to one embodiment. A direct voltage difference between the two bridge branches then determines the current flow across the connection between the bridge branches.

In one embodiment of the method, the degree of load on the DC source that can be connected to the DC input can thus be adjusted by the control of the semiconductor switches. For example, the degree of load can be adjusted by selecting the bridge branches whose semiconductor switches are used for the method. An adjustable load is made possible, for example, by adjusting the current flowing when operating two bridge branches as DC/DC converters via the voltage difference between the connected bridge branches. This can also be used for monitoring a fuel cell, for example, by recording a V(I,t) voltage characteristic.

Controlling the bridge branches as DC/DC converters is also possible with three or more connected bridge branches in one embodiment.

For the application of the method, the topology of the inverter bridge is not limited to the B6, H4 or H5 circuits mentioned, but can comprise any topology that has at least two bridge branches. Instead of a half-bridge, the bridge branches can also have, for example, an NPC (neutral-point clamped), also known as INPC (I-type NPC), a BSNPC (bi-directional switch neutral-point clamped), also known as TNPC (T-type NPC), or an ANPC (active neutral-point clamped) topology.

An inverter has a DC input and an AC output and a bridge circuit with controllable semiconductor switches. The DC input can be connected to a DC source and the bridge circuit is connected to the AC output via power chokes. The AC output can be connected to an AC grid via isolating switches, with the inverter being configured to feed electrical power provided by the DC source into the AC grid. The inverter further has a control circuit that is configured to carry out the method described before. For this purpose, the control circuit is configured, for example, as a computing circuit with memory and a processor, wherein instructions corresponding to the method steps can be executed on the processor.

Such an inverter can be used, for example, to discharge a DC source connected to the DC input. The discharge can take place with a discharge power up to the maximum power loss of the semiconductor switches.

Such an inverter can also be used, for example, to determine the power availability of a DC source connected to the DC input.

For the application to determine the DC-side power availability of the DC source, for example, a short-term load up to the maximum power loss of the inverter can be applied to the DC source and the load capacity of the DC source can be determined from the determined current and voltage values.

BRIEF DESCRIPTION OF THE FIGURES

The subject matter of the disclosure is explained in more detail below with the aid of figures.

In the figures, identical or similar elements are denoted by the same reference numerals.

DETAILED DESCRIPTION

Figure 1:
FIG. 1 schematically shows a method for operating an inverter.

FIG. 1 shows a method for operating an inverter 100. The inverter 100 can be configured as single-phase or multi-phase, for example two-phase or three-phase, and can be connected accordingly to a single-phase, two-phase or three-phase AC grid. The method has the following acts:

a) Isolating switches that connect the inverter to an AC grid are opened.

b) Semiconductor switches T1, T2, T3, T4, T5, T6 of at least two bridge branches 125 of the bridge circuit 110 are controlled in such a way that a DC source 10 connected to a DC input of the inverter 100 is loaded.

The at least two bridge branches 125 are connected on the AC side downstream of at least one power choke L1ac, L1ac_a, L1ac_b, L2ac, L2ac_a, L2ac_b, L3ac, L3ac_a, L3ac_b. The semiconductor switches T1, T2, T3, T4, T5, T6 can therefore be controlled in such a way that a sum of the totality of currents flowing out of at least one of the at least two bridge branches 125 on the AC side corresponds to the sum of the totality of currents flowing into at least one other bridge branch of the at least two bridge branches 125 on the AC side. This means that the sum of the currents flowing out of the bridge branches 125 on the AC side corresponds to the sum of the currents flowing into the bridge branches 125 on the AC side.

Figure 2:
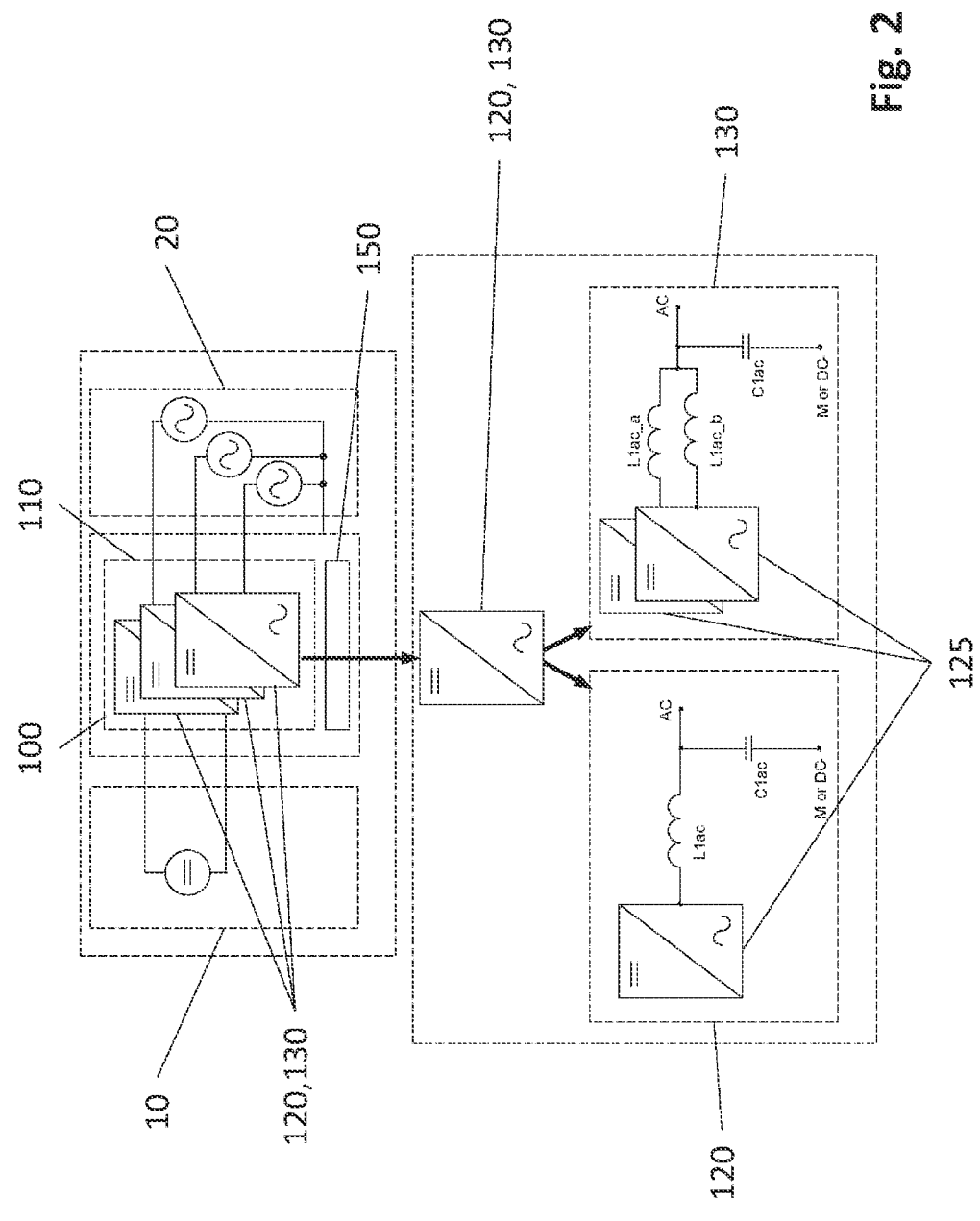
FIG. 2 schematically shows an inverter with DC source and AC grid as well as example embodiments of phase branches.

FIG. 2 shows such an inverter 100 that is configured for the method of FIG. 1 according to one embodiment. The inverter 100 has a DC input and an AC output, with the DC input being connected to a DC source 10 and three phase branches 120, 130 of a bridge circuit 110 being connected to the AC output. The AC output is connected to a three-phase AC grid 20, with the inverter 100 being configured to feed electrical power provided by the DC source 10 into the AC grid 20. The inverter 100 has one phase branch 120,130 per phase of the AC grid 20.

Each phase branch 120, 130 has bridge branches 125 and passive components such as inductors and capacitors. For connecting to the AC output, each phase branch 120, 130 has one or more power chokes L1ac, L1ac_a, L1ac_b and a capacitor C1ac for connecting with a center potential M or a negative potential DC– of the DC source 10. The phase branch 120, 130 can be configured as a monolithic phase branch 120 or as a phase branch 130 with several parallel bridge branches 125, here for example two parallel bridge branches 125. The parallel bridge branches 125 are, in one embodiment, operated using the interleaving method, in which the semiconductor switches T1, T2, T3, T4, T5, T6 of the bridge branches 125 are clocked offset to each other.

Furthermore, the inverter 100 comprises a control circuit 150 configured to control the semiconductor switches T1, T2, T3, T4, T5, T6 of the bridge branches 125.

It is possible to integrate additional DC/DC converters on the DC side of the inverter 100. For example, Si or SiC components configured as IGBTs or MOSFETs can be selected as power semiconductors for the semiconductor switches T1, T2, T3, T4, T5, T6. The method can be used, for example, for three-level 3L, or two-level 2L, or multi-level topologies, but is not limited thereto.

Figure 3:
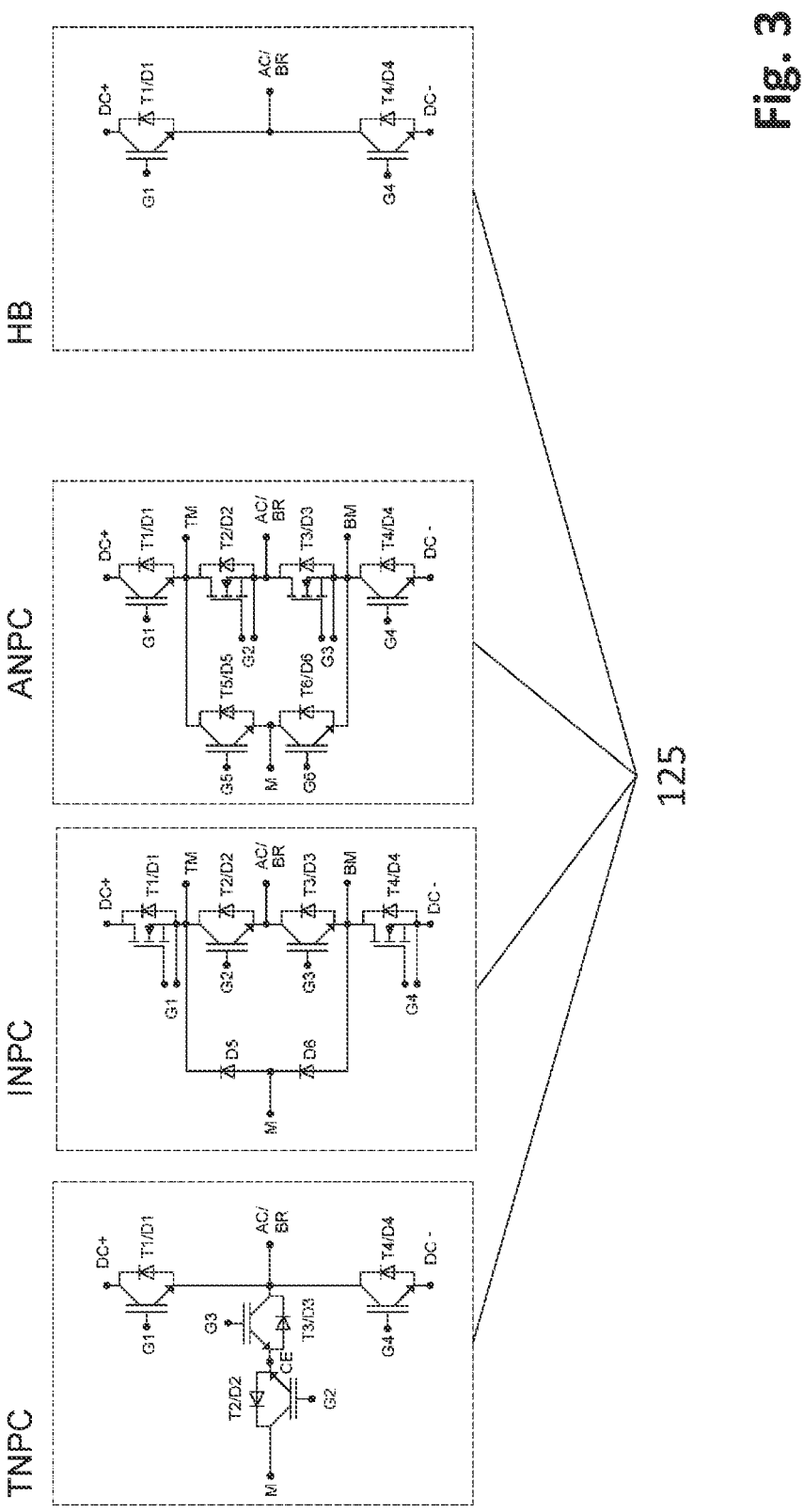
FIG. 3 shows example embodiments of bridge branches with semiconductor switches.

By way of example, FIG. 3 shows possible topologies for the bridge branches 125. Illustrated are arrangements of the semiconductor switches T1, T2, T3, T4, T5, T6 for a TNPC topology, which is alternatively also referred to as a BSNPC topology, for an INPC topology, which is alternatively also referred to as a (standard) NPC topology, and an ANPC topology, as well as further for a half-bridge HB, which is used in B6, H4 or H5 circuits, for example.

Figure 4:
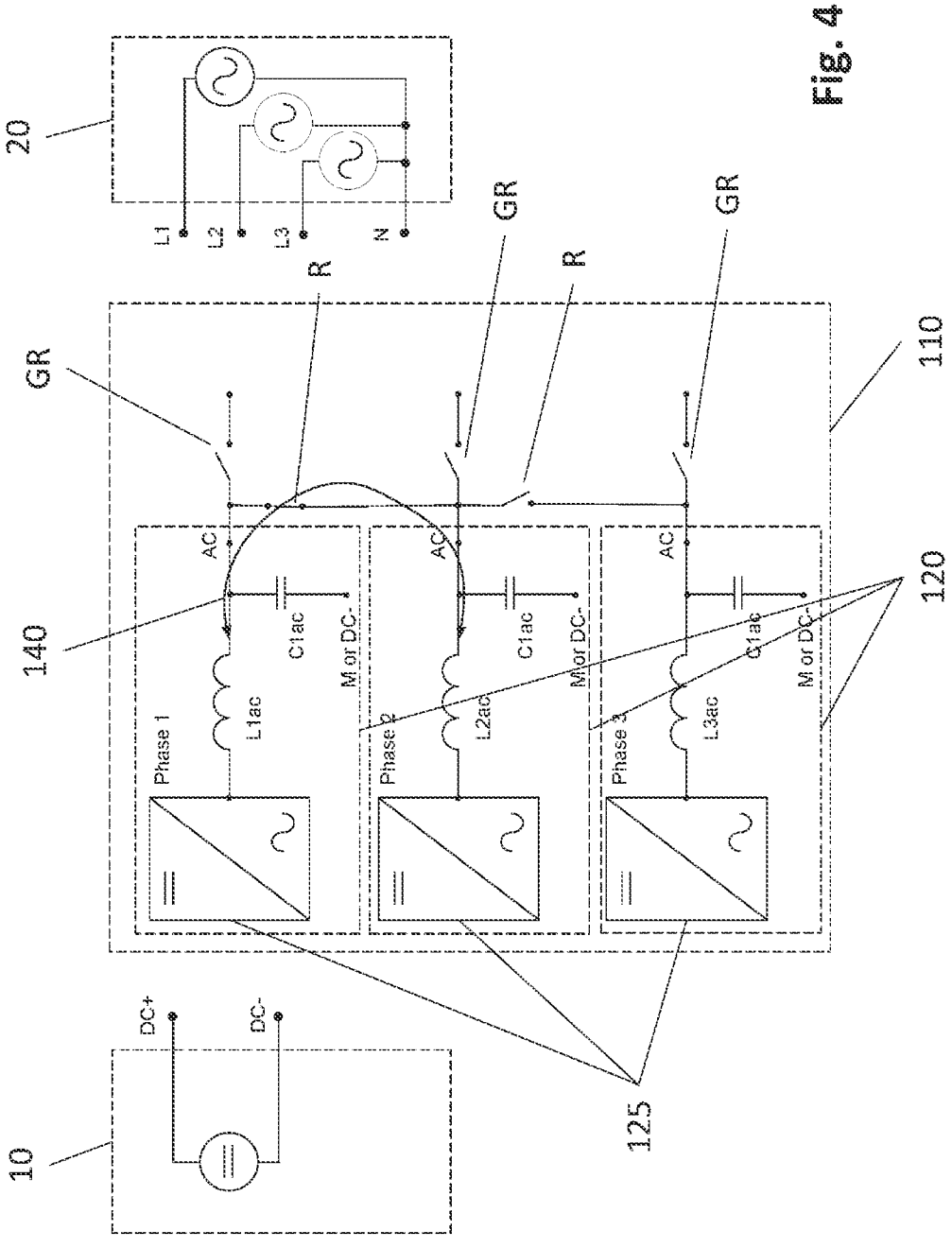
FIGS. 4 to 8 show example embodiments of three-phase bridge circuits.

FIG. 4 shows a three-phase bridge circuit 110 with monolithic phase branches 120 in which relays R connect the phases with each other. Isolating switches GR for disconnecting the inverter 100 from the AC grid 20 are open.

Each phase branch 120 has a bridge branch 125 and passive components such as power chokes L1ac, L2ac, L3ac and capacitors C1ac, C2ac, C3ac, with the bridge branches 125 being connected to the AC output via the power chokes L1ac, L2ac, L3ac. Each phase of the AC output can be connected to the AC grid 20 via the isolating switches GR.

A possible energy flow 140 represents a potential path for loss generation for loading the DC source 10. The load flow 140 takes place via one of the relays R; in the example shown between phase 1 and phase 2.

In this embodiment, an AC-side short circuit of two phases of the inverter 100 is applied. For this purpose, the two AC phases are short-circuited behind or downstream of the power chokes L1ac, L2ac via relay R and the semiconductor switches T1, T2, T3, T4, T5, T6 are controlled, for example, in such a way that the system is operated in DC/DC converter operation. Alternatively, the semiconductor switches T1, T2, T3, T4, T5, T6 can also be controlled in such a way that two AC signals that are phase-shifted by 180° are generated and the voltage at the AC output is regulated to zero.

Figure 5:
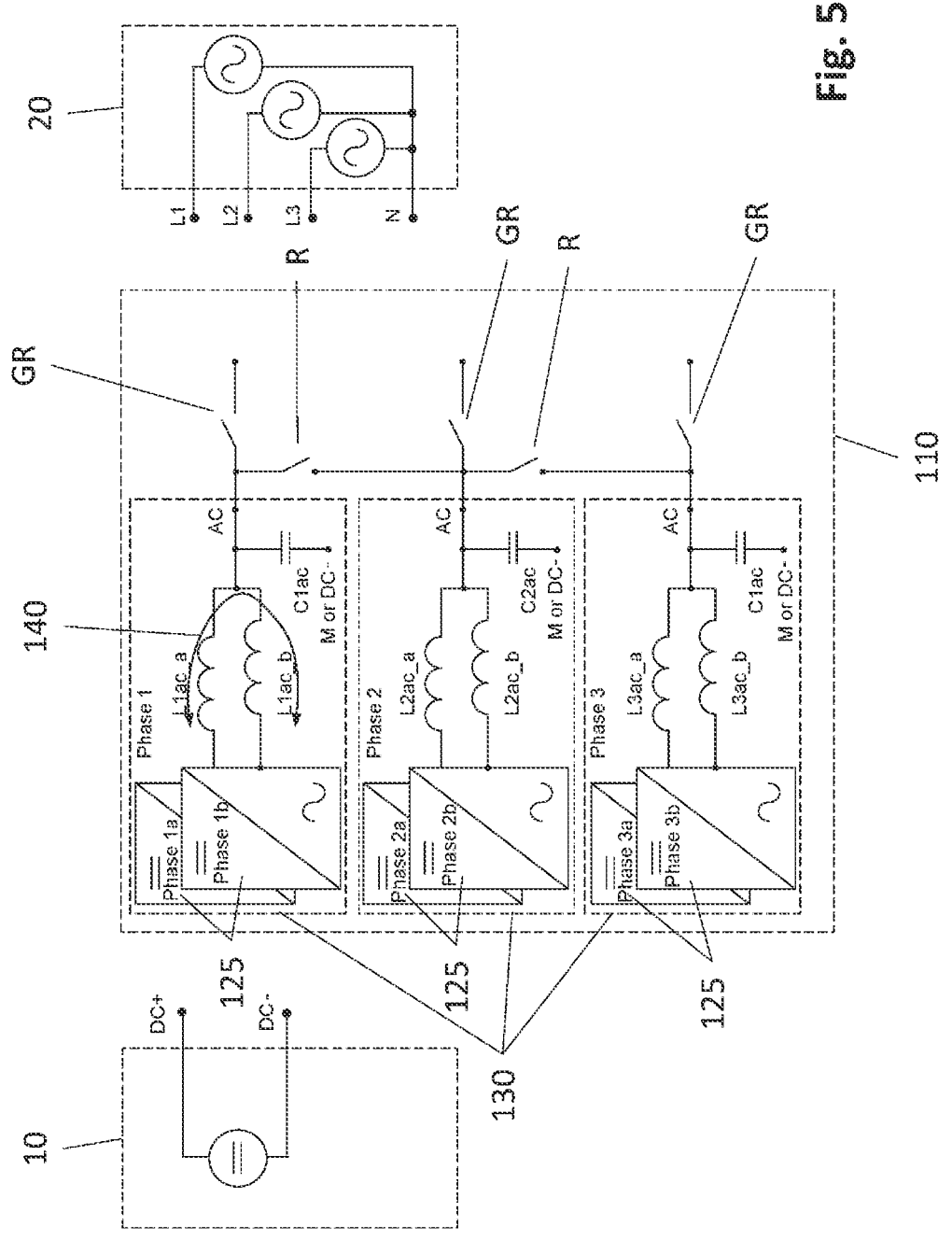

FIG. 5 shows a three-phase bridge circuit 110 with phase branches 130 in an interleaving topology. The isolating switches GR are open to disconnect the inverter 100 from the AC grid 20. Each phase of the phase branches 130 has parallel subphases phase 1a, phase1b, phase 2a, phase 2b, phase 3a, phase 3b. Each subphase has a respective bridge branch 125 and passive components such as power chokes L1ac_a, L1ac_b, L2ac_a, L2ac_b, L3ac_a, L3ac_b and capacitors C1ac, C2ac, C3ac, with the bridge branches 125 being connected to the AC output via the power chokes L1ac_a, L1ac_b, L2ac_a, L2ac_b, L3ac_a, L3ac_b. Each phase of the AC output can be connected to the AC grid 20 via isolating switches GR.

Relays R can optionally be used in the three-phase bridge circuit 110 in FIG. 5. However, the method can also be implemented here without the relays R. A possible energy flow 140 represents a potential path for loss generation for loading the DC source 10. In the example shown, the load flow 140 takes place without relay R. The load flow 140 can, for example, take place directly via the connection point of the subphases phase 1a and phase 1b.

A possible energy flow 140 as shown in FIG. 4 via an optional closed relay R, e.g., between phase 1 and phase 2, would alternatively also be possible in the three-phase bridge circuit 110 pursuant to FIG. 5.

Figure 6:
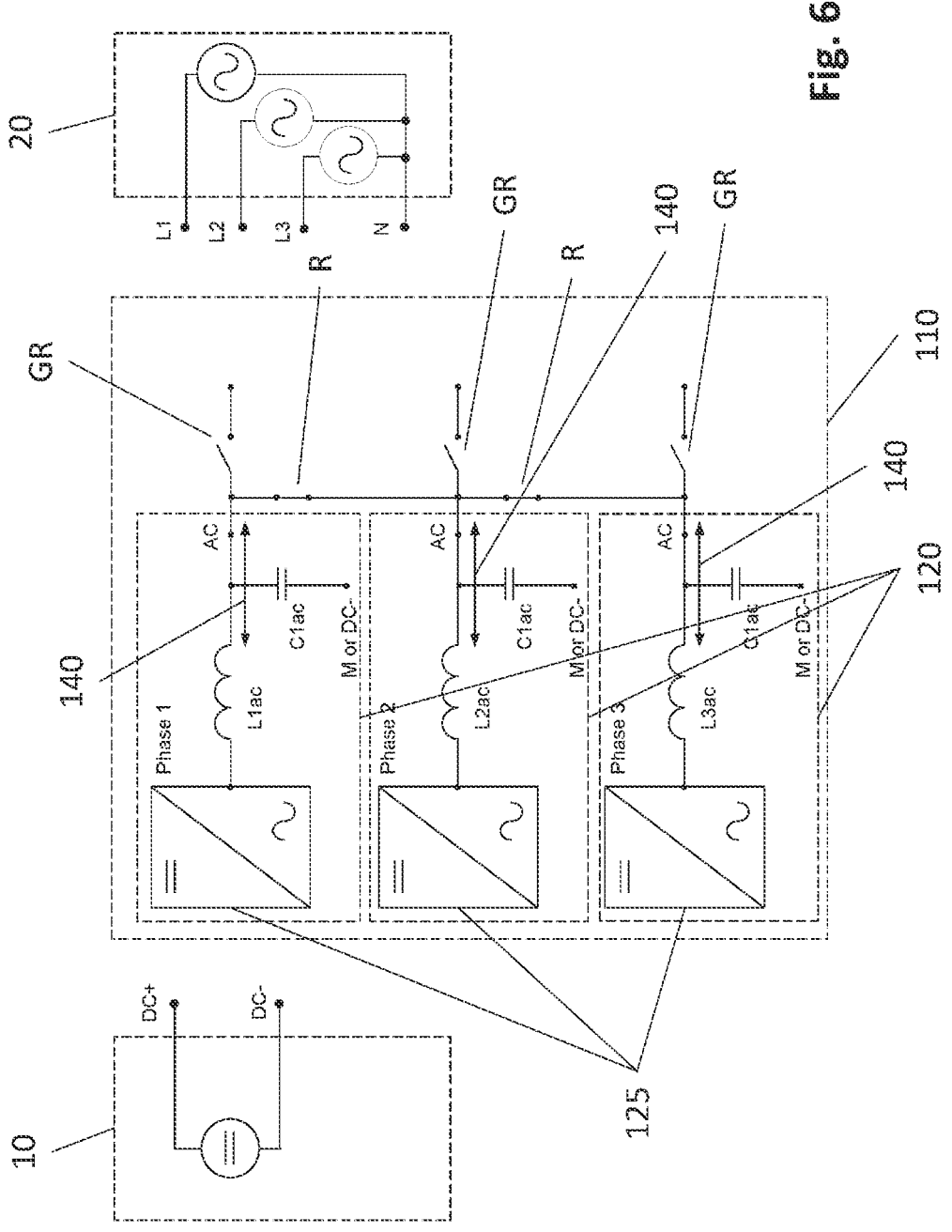

FIG. 6 shows an embodiment with a three-phase bridge circuit 110 with monolithic phase branches 120, in which all three phases are connected via the two relays R. Controlling the semiconductor switches T1, T2, T3, T4, T5, T6 in the bridge branches 125 is carried out in such a way that power is fed to the AC-side short circuit and energy flows 140 are enabled.

In this embodiment, an AC-side short circuit of three phases of the inverter 100 is applied. For this purpose, the three AC phases are short-circuited behind or downstream of the power chokes L1ac, L2ac, L3ac via the relays R and the semiconductor switches are controlled in such a way that the system is clocked to a short circuit. Alternatively, the bridge branches can also be operated as DC/DC converters.

Figure 7:
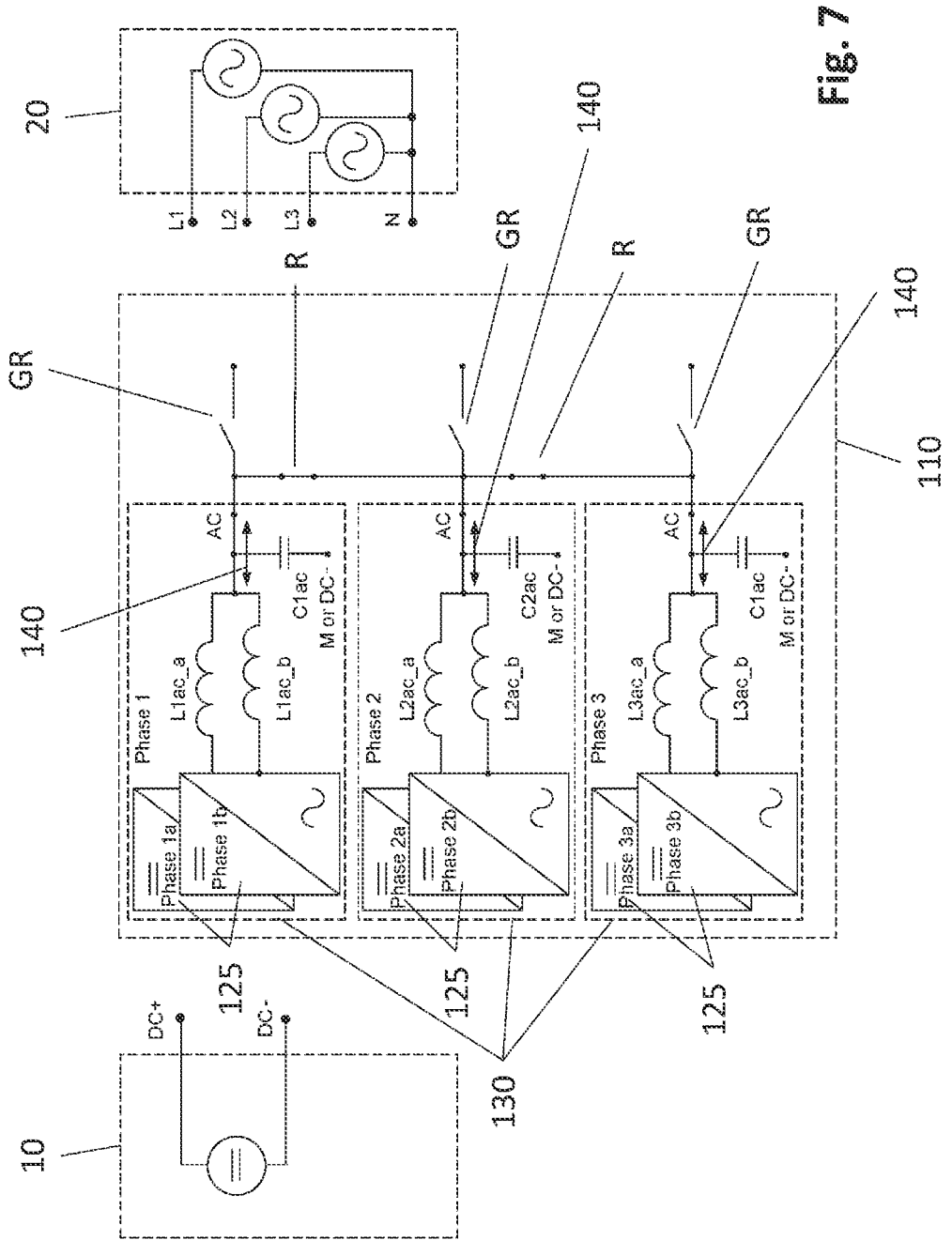

FIG. 7 shows an embodiment of a three-phase bridge circuit 110 with interleaving phase branches 130, in which all three phases—and thus also the subphases—are connected via the two closed relays R. Controlling the semiconductor switches T1, T2, T3, T4, T5, T6 in the bridge branches 125 is carried out in such a way that power is fed to the AC-side short circuit and energy flows 140 are enabled. Alternatively, here too, the bridge branches can be operated as DC/DC converters.

Figure 8:
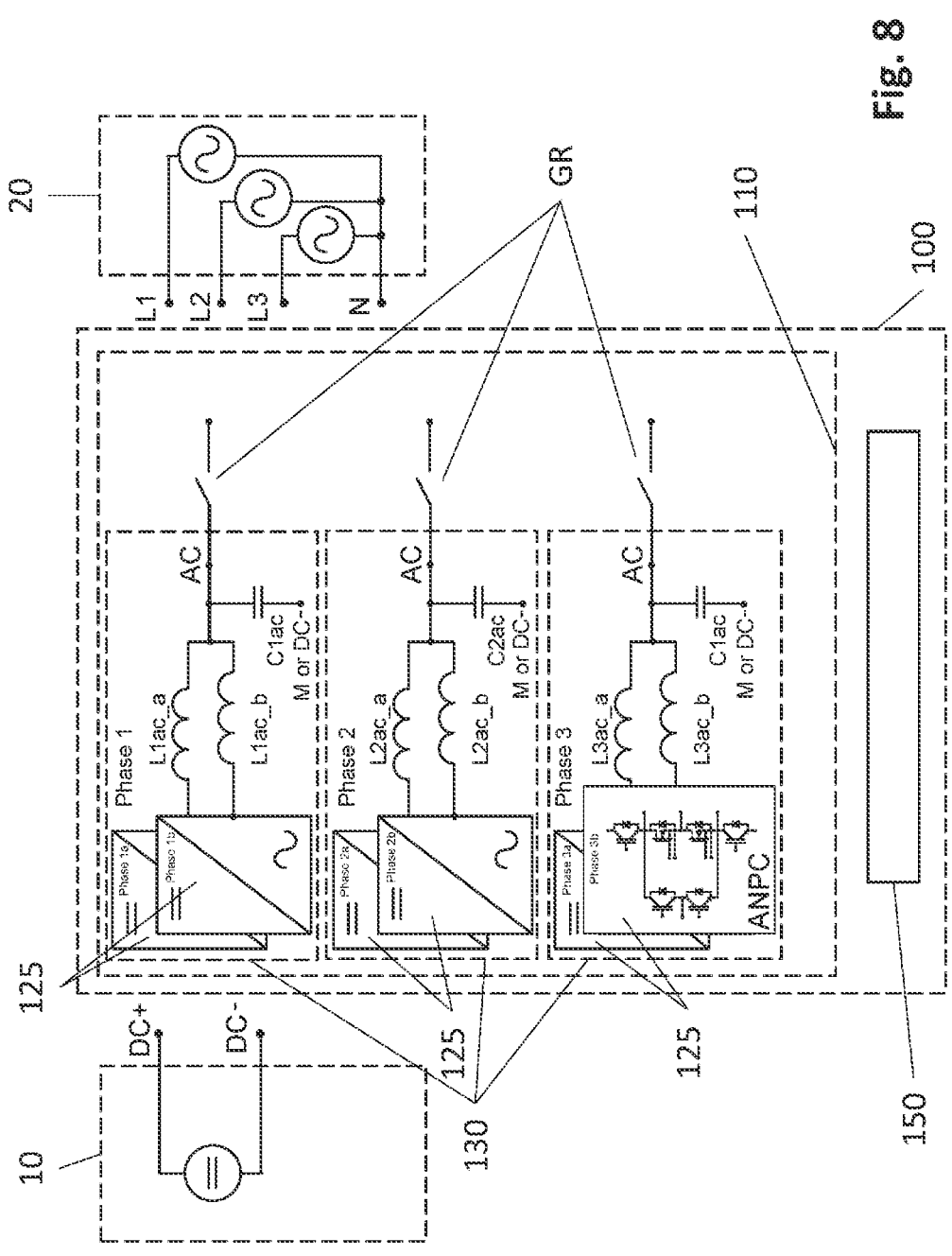

FIG. 8 shows an embodiment of a three-phase bridge circuit 110 with interleaving phase branches 130. The three-phase inverter 100 has two respective subphases, e.g., in ANPC topology in interleaving. The bridge branches 125 are configured, for example, in ANPC topology and no relays R are provided between the phases in this example embodiment. The inverter 100 thus has two bridge branches for each of the three phases, which are connected in parallel on both the AC side and the DC side. Optionally, the inverter 100 can also have more subphases per phase.

The AC grid 20 can be disconnected from the inverter 100 via the isolating switches GR.

The method for operating the inverter 100 in FIG. 8 may have the following acts, for example:

a) Opening the isolating switches GR to disconnect the inverter 100 from the AC grid 20. As a result, subphases 1*a* and 1*b* as well as subphases 2*a* and 2*b* as well as subphases 3*a* and 3*b* are connected in parallel to each other.

b) Switching the operating method on the AC side of the phases from AC current-regulated to DC current- or voltage-regulated. The semiconductor switches T1, T2, T3, T4, T5, T6 of the bridge branches 125 are controlled in such a way that the bridge branches 125 in connection with the power chokes L1*ac*_a, L1*ac*_b, L2*ac*_a, L2*ac*_b, L3*ac*_a, L3*ac*_b and the capacitors C1*ac*, C2*ac*, C3*ac* take the function of DC/DC converters (FIG. 9).

Figure 9:
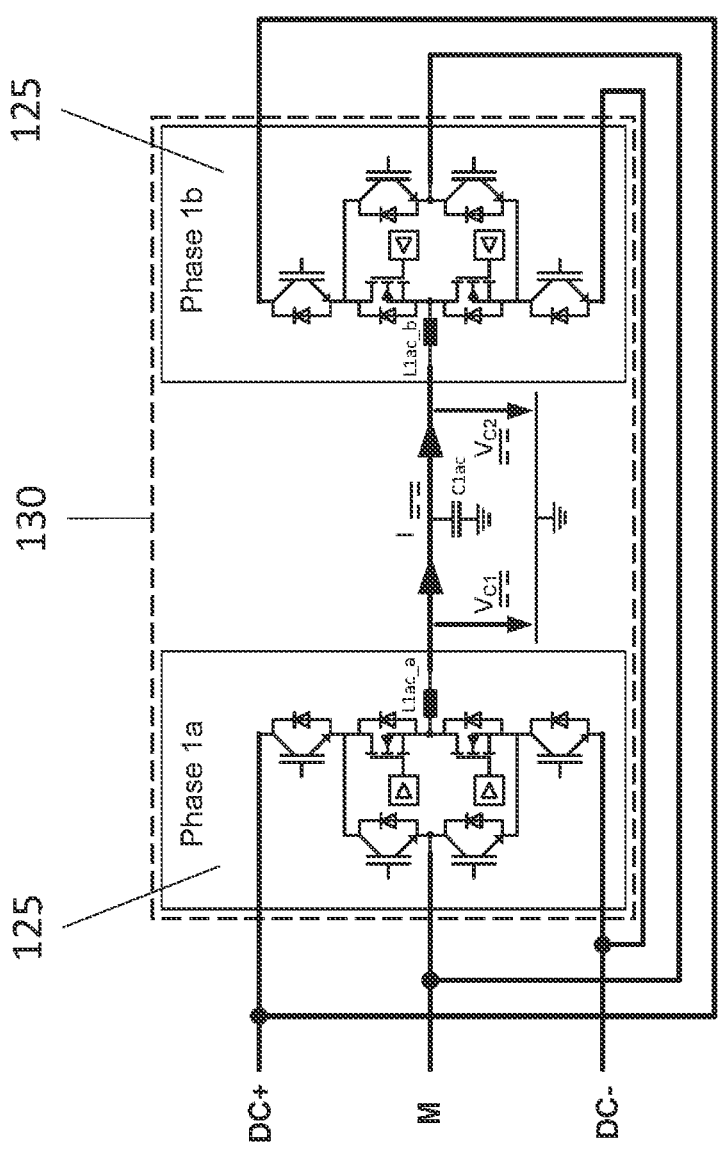
FIG. 9 schematically shows the operation of two bridge branches of FIG. 8.

FIG. 9 shows this in an example manner on the basis of phases 1*a* and 1*b*. The regulation of the power loss and thus also the identification of the desired DC power for a safe and reliable AC grid connection and/or for a desired discharge power of the DC source can be carried out via the current I, which results from the difference between the voltages Vc1 and Vc2, which are set as nominal values for the output voltages of the two DC/DC converters.

Figure 10:
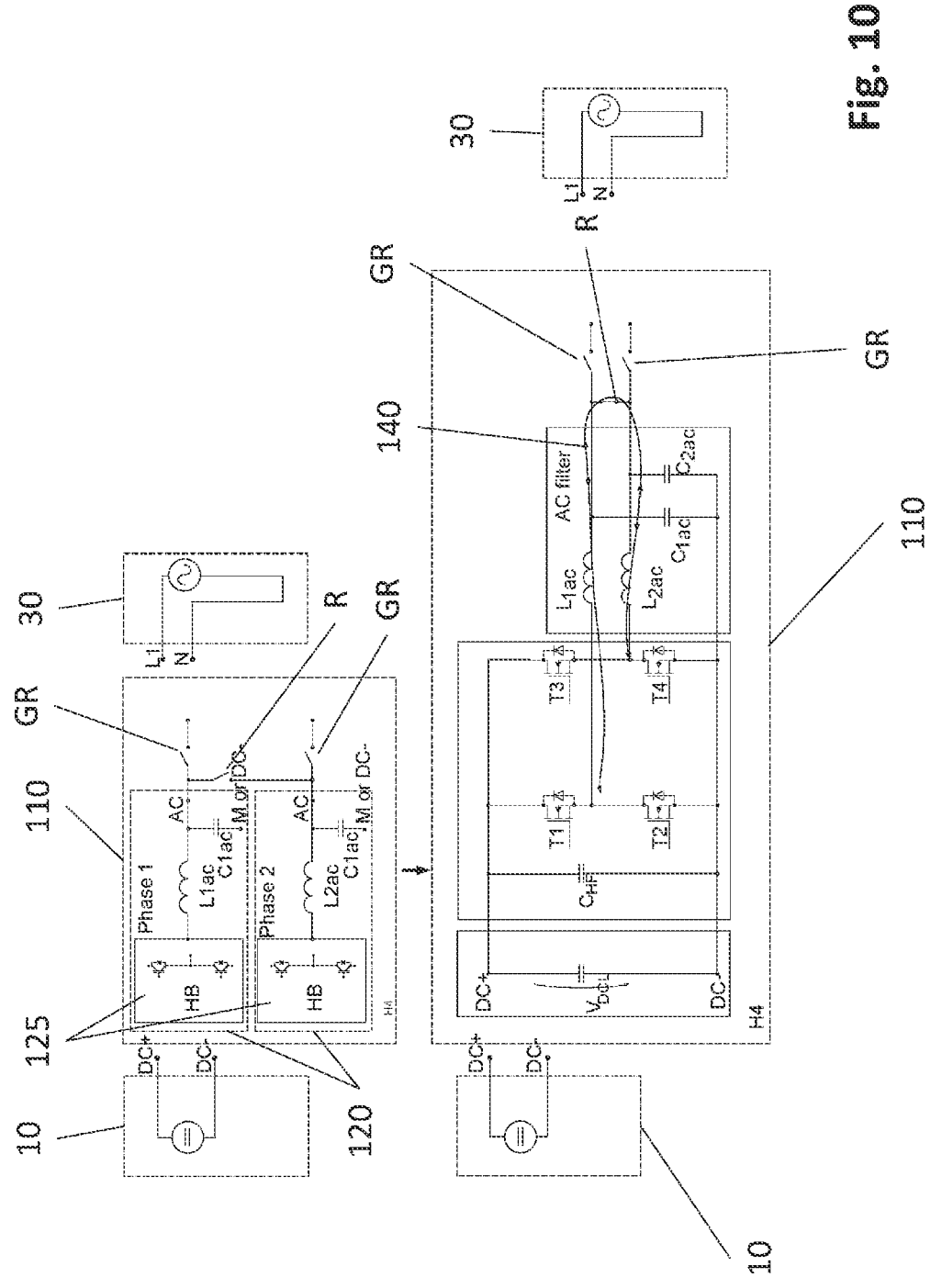
FIGS. 10 and 11 show example embodiments of single-phase bridge circuits.

FIG. 10 shows a bridge circuit 110 in H4 topology for a single-phase inverter 100. The phase branches 120 of an H4 topology are the same as the phase branches 120 of a three-phase B6 bridge circuit. The bridge branches 125 are configured as half bridges and are connected via the power chokes L1*ac* and L2*ac* to the AC output, which can be connected to the AC grid 30 via the isolating switches GR. The phase branches 120 can be connected via the relay R for carrying out the method, in particular for achieving a self-consumption.

In the lower part of FIG. 10, a load flow 140 for carrying out the method, for example, for achieving a self-consumption, is shown by way of example for a single-phase H4 topology with relay R for connecting the two phases. The isolating switches GR are open and a load flow 140 can be achieved between the half bridges T1/T2 and T3/T4 via the relay R. Controlling the semiconductor switches T1, T2, T3, T4 of the bridge branches 125 is carried out here analogous to the controlling of FIG. 4, FIG. 8 or FIG. 9 either by operating the bridge branches 125 in connection with the power chokes L1*ac* and L2*ac* and the capacitors C1*ac* and C2*ac* as DC/DC converters or by operating the bridge branches 125 as an inverter bridge whose output voltage is regulated to zero according to the existing short circuit.

Figure 11:
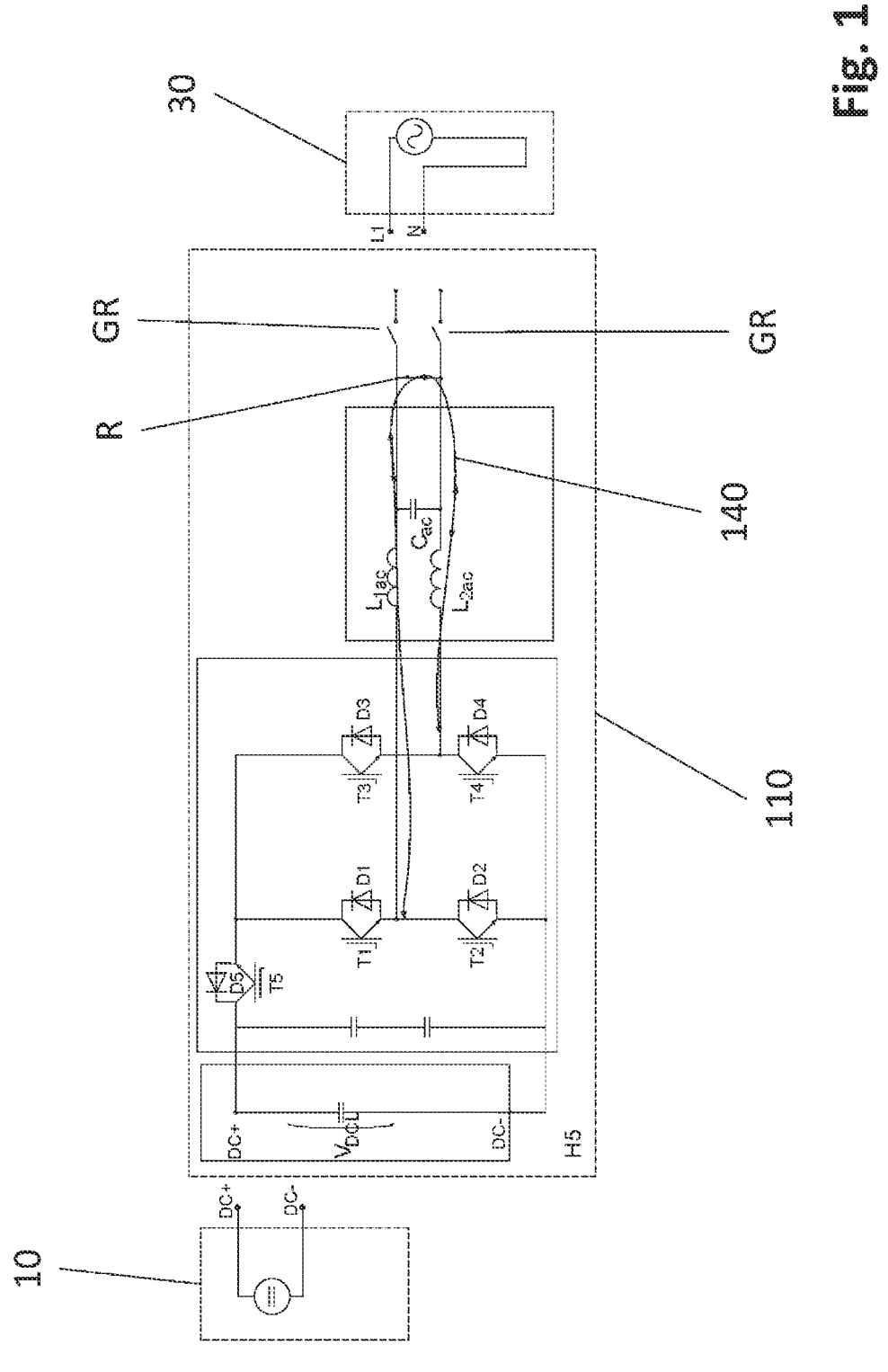

FIG. 11 shows an example of a load flow 140 for carrying out the method, for example, for achieving a self-consumption, for a single-phase H5 topology with relay R for connecting the two phases. The isolating switches GR are open and a load flow 140 can be achieved between the half bridges T1/T2 and T3/T4 via the relay R. Controlling the semiconductor switches T1, T2, T3, T4, T5 of the bridge branches 125 is carried out here analogously to the controlling of FIG. 4, FIG. 8 or FIG. 9 either by operating the bridge branches 125 in connection with the power chokes L1*ac* and L2*ac* and the capacitors C1*ac* and C2*ac* as DC/DC converters or by operating the bridge branches 125 as an inverter bridge whose output voltage is regulated to zero according to the existing short circuit.

What is claimed is:

1. A method for operating an inverter with a DC input and an AC output, in which the DC input is configured to be connected to a DC source, and bridge branches of a bridge circuit of the inverter are connected to the AC output via power chokes, wherein the bridge branches are associated with different phases of the inverter, respectively, and the AC output is configured to be connected to an AC grid via isolating switches, wherein the inverter is configured to feed electrical power to the AC grid, comprising:

opening the isolating switches, and controlling semiconductor switches of at least two bridge branches of the bridge circuit, the at least two bridge branches associated with different phases of the inverter being connected downstream of at least one power choke at an AC side of the inverter, such that a DC source connected to the DC input is loaded, wherein a sum of a totality of currents flowing out of at least one of the at least two bridge branches on the AC side corresponds to a sum of a totality of currents flowing into at least one other bridge branch of the at least two bridge branches on the AC side.

2. The method according to claim 1, wherein the inverter is configured to feed electrical power into a single-phase or multi-phase AC grid, wherein the inverter has for each phase at least two parallel bridge branches that are connected on the AC side downstream of the at least one power choke, and whose semiconductor switches are controlled in such a way that the DC source connected to the DC input is loaded, wherein the bridge branches are configured to operate in an interleaving mode.

3. The method according to claim 1, wherein a connection on the AC side of the at least two bridge branches of the bridge circuit downstream of the at least one power choke is effected by closing a relay.

4. The method according to claim 3, wherein the inverter is configured to feed electrical power into a three-phase AC grid, wherein the inverter has at least one bridge branch for each phase, and a first bridge branch from a first phase and a second bridge branch from a second phase are connected with each other on the AC side downstream of the at least one power choke, and the semiconductor switches are controlled in such a way that a current flowing out of the first bridge branch flows into the second bridge branch.

5. The method according to claim 3, wherein the inverter is configured to feed electrical power into a three-phase AC grid, wherein the inverter has at least one bridge branch for each phase, and three bridge branches are connected with each other on the AC side downstream of the at least one power choke, and the semiconductor switches are controlled in such a way that a current flowing out of at least one bridge branch of one phase is divided and flows into at least one bridge branch of each of the other two phases or that currents flowing out of at least one bridge branch of each of two phases flow in total into the at least one bridge branch of a third phase.

6. The method according to claim 1, wherein the inverter is configured to feed electrical power into a single-phase AC grid.

7. The method according to claim 1, wherein the semiconductor switches for loading the DC source connected to the DC input are controlled in such a way that the inverter is operated in a voltage-controlled operation with a voltage of zero at the AC output.

8. The method according to claim 1, wherein a degree of load of the DC source connected to the DC input is adjustable by a control of the semiconductor switches.

9. The method according to claim 4, wherein the bridge circuit is a B6 bridge circuit.

10. The method according to claim 5, wherein the bridge circuit is a B6 bridge circuit.

11. The method according to claim 6, wherein the bridge circuit is an H4 bridge circuit or an H5 bridge circuit.

12. The method according to claim 1, wherein the bridge branches each have a TNPC (T-type neutral-point clamped), INPC (I-type neutral-point clamped) or ANPC (active neutral-point clamped) topology.

13. The method according to claim 4, wherein the bridge branches each have a TNPC (T-type neutral-point clamped), INPC (I-type neutral-point clamped) or ANPC (active neutral-point clamped) topology.

14. The method according to claim 5, wherein the bridge branches each have a TNPC (T-type neutral-point clamped), INPC (I-type neutral-point clamped) or ANPC (active neutral-point clamped) topology.

15. An inverter with a DC input and an AC output and a bridge circuit with controllable semiconductor switches, in which the DC input is configured to be connected to a DC source, and bridge branches of the bridge circuit of different phases of the inverter are connected via power chokes to the AC output and selectively coupled together downstream of the power chokes via switching circuitry, and the AC output is configured to be connected to an AC grid via isolating switches, wherein the inverter is configured to feed electrical power into the AC grid and wherein the inverter has a control circuit that is configured to carry out the method according to claim 1.

\* \* \* \* \*